United States Patent
Dorrance et al.

(10) Patent No.: US 6,430,598 B1
(45) Date of Patent: Aug. 6, 2002

(54) METHOD AND SYSTEM FOR DELETING MESSAGES FROM A SERVER

(75) Inventors: Daniel Dorrance, Round Rock; Jerry Walter Malcolm, Austin, both of TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/240,638

(22) Filed: Jan. 29, 1999

(51) Int. Cl.⁷ .............................................. G06F 17/30
(52) U.S. Cl. ..................... 709/203; 709/206; 709/217
(58) Field of Search ............................... 709/200, 201, 709/204, 203, 206, 217, 219, 313–314, 318; 705/50, 64, 75; 345/326, 333, 335; 713/200

(56) References Cited

U.S. PATENT DOCUMENTS

| | | | |
|---|---|---|---|
| 5,465,328 A | * 11/1995 | Dievendorff et al. | 714/15 |
| 5,632,018 A | 5/1997 | Otorii | 395/200.04 |
| 5,704,041 A | 12/1997 | Allen et al. | 395/200.15 |
| 5,727,148 A | 3/1998 | Takekawa | 395/200.04 |
| 5,734,820 A | * 3/1998 | Howard et al. | 713/200 |
| 5,748,915 A | * 5/1998 | Iijima | 710/105 |
| 5,768,505 A | 6/1998 | Gilchrist et al. | 395/200.31 |
| 5,809,242 A | 9/1998 | Shaw et al. | 395/200.47 |
| 5,812,780 A | 9/1998 | Chen et al. | 395/200.54 |
| 5,826,269 A | 10/1998 | Hussey | 707/10 |
| 5,832,218 A | 11/1998 | Gibbs et al. | 395/200.33 |
| 5,862,325 A | * 1/1999 | Reed et al. | 709/201 |
| 6,023,722 A | * 2/2000 | Colyer | 709/201 |
| 6,256,634 B1 | * 7/2001 | Moshaiov et al. | 707/100 |

FOREIGN PATENT DOCUMENTS

EP    0800144    10/1997    ........... G06F/17/60

OTHER PUBLICATIONS

IBM Technical Disclosure Bulletin, vol. 39, No. 02, Feb. 1996, "Use of Database for Efficient and Compatible Storage and Retrieval of E–Mail."
Open Financial Exchange, Bill Payment, Dec. 17, 1998.
Open Financial Exchange, About OFX, Dec. 17, 1998.

* cited by examiner

*Primary Examiner*—Zarni Maung
*Assistant Examiner*—Wen Tai Lin
(74) *Attorney, Agent, or Firm*—Leslie A. Van Leeuwen; Bracewell & Patterson, L.L.P.

(57) ABSTRACT

A method and system are disclosed for reliably deleting messages from an electronic mail server system, where the electronic mail server system operates within a client/server network system having at least one client connected to a server and operates independently of a protocol utilized by the client/server network system between the client and the server, where at least one protocol utilized by the client does not provide an explicit delete signal. The client requests a transmission of messages from the server. A list of references to the requested messages to be transmitted from the server is logged within the server. The requested messages are then transmitted from the server to the client. The client may send an acknowledgement of the reception of the transmission of the requested messages from the server to the client in a first communication protocol. However, if the acknowledgement is not sent in the first communication protocol, then the reception of the requested messages is inferred. A reception is inferred if an acknowledgement is searched for and found in a second communication protocol which is associated with the transmission of the requested messages.

13 Claims, 5 Drawing Sheets

METHOD AND SYSTEM FOR DELETING MESSAGES FROM A SERVER

BACKGROUND OF THE PRESENT INVENTION

1. Field of the Present Invention

The present invention relates in general to improved client/server data communication systems and, more particularly, to an improved electronic mail system for use within a client/server data communication system. Still more particularly, the present invention relates to a method and system for an electronic mail system to reliably delete messages from a server independent of a protocol utilized by the client/server data communication system for transmitting data where at least one protocol utilized by a client does not provide an explicit delete signal.

2. Description of the Related Art

Computers are well-known in the art and have become a business staple as well as being utilized in many homes. One feature available through computers is that of using electronic mailing (e-mail) to send messages to and receive messages from other computers by a server system. E-mail allows clients of a network system, which is maintained, by a server system, to send messages or data from one user to another. The network system may include a fixed group of computers connected across a local area network (LAN) or may be a medium such as the "Internet" which includes millions of computers, each with access to a server which is part of a large server system infrastructure. A client system typically allows the user to perform such operations as composing, updating, and sending e-mail messages while the server in such a system provides a server based message repository, as well as providing message transmission and reception functions for the user at the client level.

Multiple software applications have been developed to support the user in performing the aforementioned e-mail operations. Beneath the software, multiple protocols have also been developed which aid in the transfer of data and messages. One well-known internet messaging protocol is the Post Office Protocol (POP). Users are provided the ability to send and receive messages transferred across the internet through POP. In addition, POP provides for attaching to messages other data such as a graphic or audio block.

Another internet based client/server communication protocol is known as Open Financial Exchange (OFX). OFX is a unified specification for the electronic exchange of financial data between financial institutions, businesses and consumers via the internet. OFX supports both synchronous and asynchronous transfers of data. In an example of synchronous transfer, a client may synchronously connect with a server to obtain an accurate status of all recent and scheduled transactions for a checking account where data is packaged in the OFX protocol. The user may then view the data through a financial based software application that supports OFX protocol. Since the data is transferred through a server to the client synchronously, the data does not need to be stored in the server for later retrieval. In another example, users may engage in asynchronous use by utilizing a mail template within the financial software application to compose and send a message to an account manager requesting a response to a specific question. The message is packaged in OFX protocol when sent to the server, but may be converted into another protocol by the server for transmitting the message across the internet to another server from which the account manager may receive the message. The account manager may provide a message in response at any time after receiving the message. After the message has been received at the client's designated server, the user could then request the response from the server at any time. The server would convert the response message back into OFX protocol before sending the response message to the client.

As users of a client/server system expand, the number of protocols utilized within a single client are also expanding. For example, a single client may include one piece of software supported by POP and another piece of software supported by OFX. A server must understand and process data in both types of protocol. However, not all protocols include the same functions needed by the server to correctly process data packaged in different protocols. For example, POP includes a reply to the server of an explicit delete signal if the message has been received and viewed at a client system such that the server can delete the message from storage with a high degree of security that the message has been properly delivered. However, OFX does not include an explicit delete signal to the server after a transmittal since the protocol is typically utilized for synchronous transfer of data. Since servers are typically programmed such that a receipt of delivery is required before a message may be deleted from the server, the lack of receipt from OFX may cause the server to utilize resources unnecessarily in order to store messages which have been properly delivered in OFX protocol. In another method, for the server to reduce the resources utilized by undeleted messages in OFX protocol, the server may retain all data until a receipt of delivery is received or until the resources for saving data are exhausted whereby the last data in the queue would be deleted. However, by this method, data may be deleted before it has been delivered.

From the foregoing, it should be apparent to one skilled in the art that a need exists for a method of reliably deleting messages from a server which may support multiple protocols where at least one of the protocols supported does not provide an explicit delete signal.

SUMMARY OF THE PRESENT INVENTION

It is therefore one object of the present invention to provide an improved client/server data communication system.

It is another object of the present invention to provide an improved electronic mail system for use within a client/server data communication system.

It is yet another object of the present invention to provide a method and system for an electronic mail system to reliably delete messages independent of a protocol utilized by the client/server data communication system for transmitting data where at least one protocol utilized by a client does not provide an explicit delete signal.

The foregoing objects are achieved as is now described. A method and system are disclosed for reliably deleting messages from an electronic mail server system, where the electronic mail server system operates within a client/server network system having at least one client connected to a server and operates independently of a protocol utilized by the client/server network system between the client and the server, where at least one protocol utilized by the client does not provide an explicit delete signal. The client requests a transmission of messages from the server. A list of references to the requested messages to be transmitted from the server is logged within the server. The requested messages are then transmitted from the server to the client. The client may send an acknowledgement of the reception of the transmission of the requested messages from the server to the client in a first protocol layer. However, if the acknowledgement is not sent in the first protocol layer, then the reception of the requested messages is inferred. A reception is inferred if an acknowledgement is searched for and found in a second protocol layer which is associated with the transmission of the requested messages. The list of the requested messages is retrieved upon acknowledgement of reception of the requested messages which are referenced in the list of the requested messages. The messages referenced in the retrieved list of the requested messages are automatically deleted from the server such that requested messages transmitted in a protocol which does not provide an explicit delete acknowledgement may be automatically deleted from the server.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
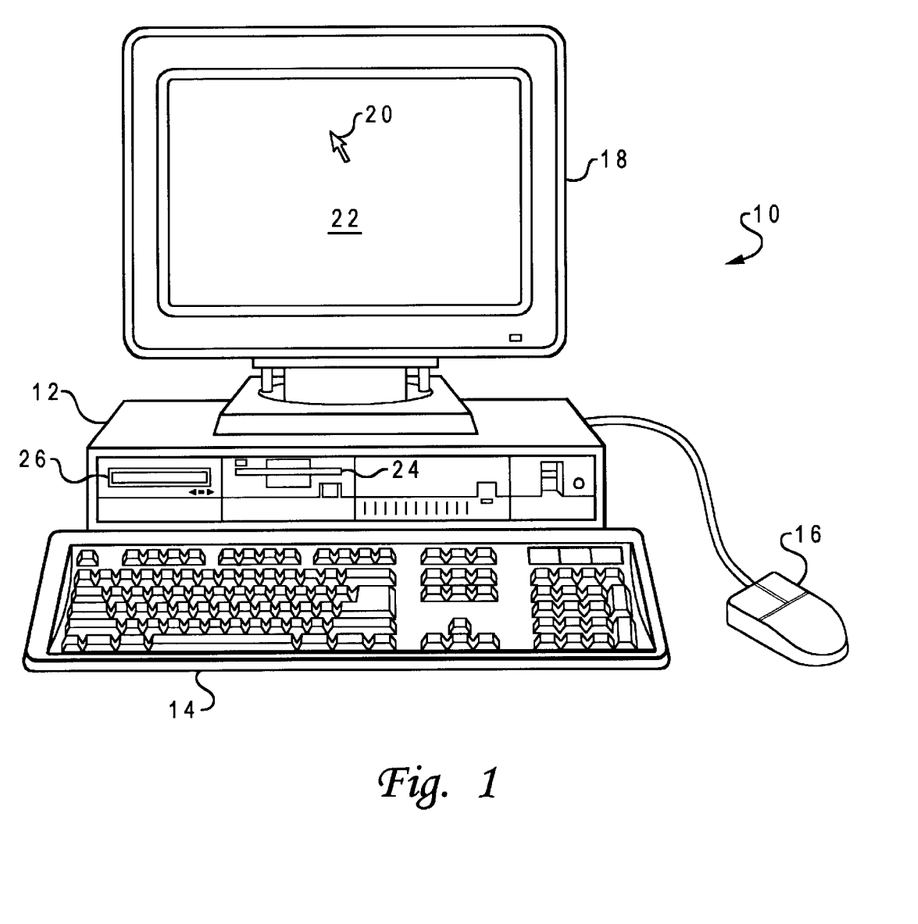
FIG. 1 depicts an illustrative diagram of a representative hardware environment according to the method and system of the present invention.

With reference now to the figures and in particular with reference to FIG. 1, there is illustrated a diagram of a representative hardware environment of a personal computer 10 which utilizes an operating system. Personal computer 10 comprises processor unit 12, keyboard 14, mouse 16, and video display (or monitor) 18. Keyboard 14 and mouse 16 constitute user input devices, and video display 18 constitutes an user output device. Mouse 16 is utilized to control cursor 20 displayed on screen 22 of video display 18. Personal computer 10 supports a Graphical User Interface (GUI) which allows a user to "point-and-click" by moving cursor 20 to an icon or specific location on screen 22 via mouse 16 and then depressing one of the buttons on mouse 16 in order to perform a user command. Floppy disk drive 24 and compact disk drive (CD-ROM) 26 provide external data storage devices.

Figure 2:
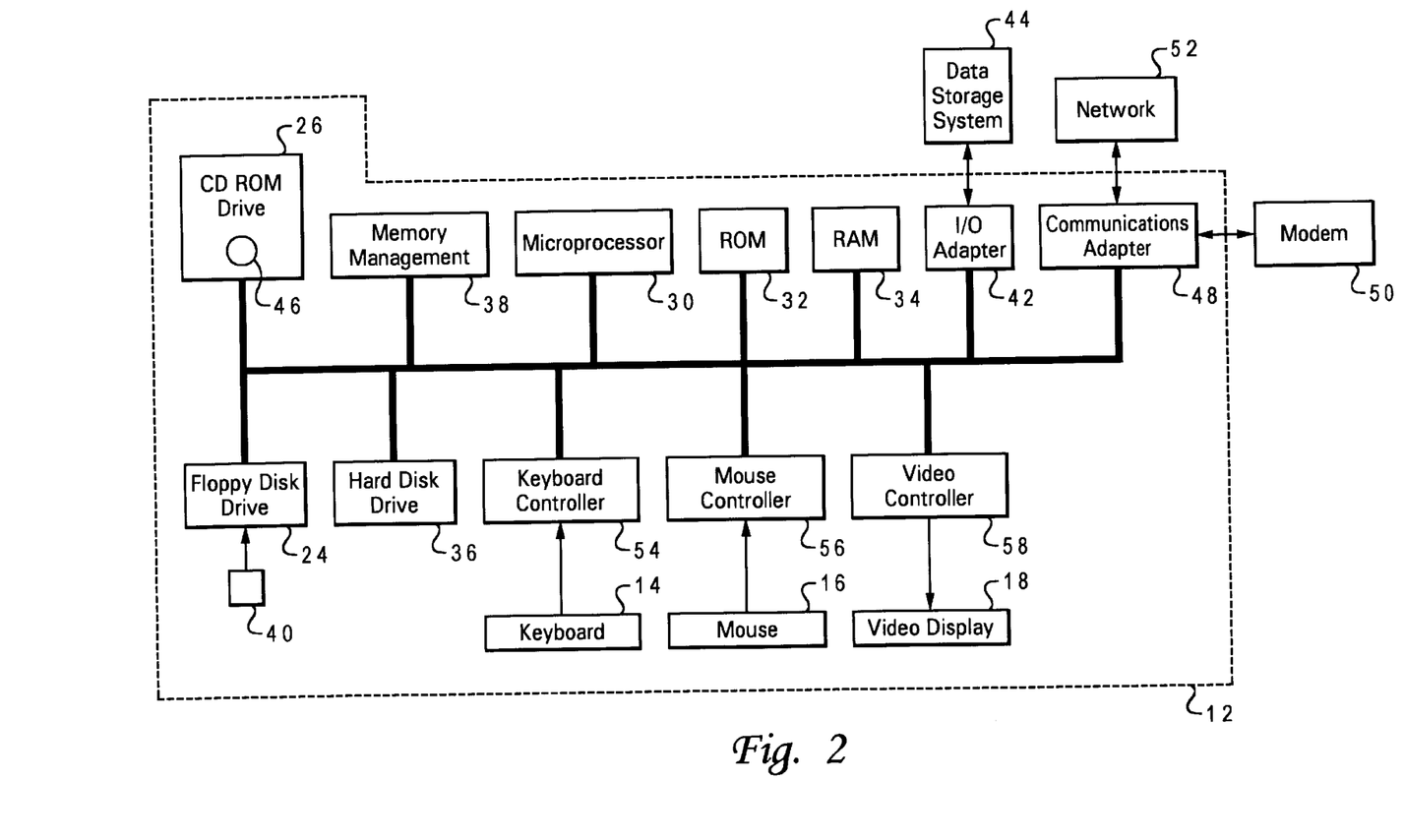
FIG. 2 illustrates a functional block diagram of a representative hardware environment according to the method and system of the present invention.

With reference now to FIG. 2, there is depicted a functional block diagram of personal computer 10 illustrated in FIG. 1. Processor unit 12 includes a system bus 28 to which various functional blocks are attached and by which communications among various functional blocks are accomplished. Microprocessor 30, connecting to system bus 28, is supported by read only memory (ROM) 32 and random access memory (RAM) 34, both of which are connected to system bus 28.

ROM 32 contains, among other codes, the Basic Input/Output System (BIOS) which controls certain basic hardware operations, such as interactions of hard disk drive 36 and floppy disk drive 24. RAM 34 is the main memory within which the operating system having the present invention incorporated and other application programs operate within. A memory management device 38 is connected to system bus 28 for controlling all Direct Memory Access (DMA) operations such as paging data between RAM 34 and hard disk drive 36 or floppy disk drive 24. An application program which directs the implementation of the present invention may be provided to personal computer 10 for storage in a storage medium such as hard disk drive 36 via a variety of signal-bearing media which include, but are not limited to writeable storage media such as a floppy disk 40 which may be readable by floppy disk drive 24 for storage into the storage medium of computer 10. Application programs can be written in a variety of programming languages supported by the operating system, including but not limited to C++.

Referring still to FIG. 2, an I/O adapter 42 is illustrated connected to system bus 28 for providing an interface for data storage peripheral devices such as data storage system 44. Additional I/O adapters may be included to expand the storage capacity accessible by personal computer 10.

Other peripheral devices illustrated include compact disk drive 26 having a compact disk 46 inserted therein which is installed within processor unit 12. In addition, peripherals such as optical storage media, printers, etc. may also be added to personal computer 10. Further, a communications adapter 48 may be utilized to communicate with other data processing systems (not shown). Communications adapter 48 may support a modem 50 and a network link 52 such as an ethernet link which allows personal computer 10 to communicate with other data processing systems. Modem 50 allows personal computer 10 to communicated with other data processing systems over the internet through data transfer lines including but not limited to telephone and ISDN lines. Network link 52 may provide personal computer 10 with access to communications with other computers (not shown) in a fixed network of computers over network links. The network may provide further access for personal computer 10 to communicate with other data processing systems over the internet. In addition to modem 50 and network link 52, communications adapter 48 may support other communication means. Preferably, a server includes an adapter for supporting multiple communication links.

To complete the description of processor unit 12, there are three input/output (I/O) controllers, namely, keyboard controller 54, mouse controller 56 and video controller 58, all of which are connected to system bus 28. As their names imply, keyboard controller 54 provides the hardware interface for keyboard 14, mouse controller 56 provides the hardware interface for mouse 16, and video controller 58 provides the hardware interface for video display 18. FIGS. 1 and 2 represent a typical client or server according to the present invention but may vary for a specific application.

Figure 3:
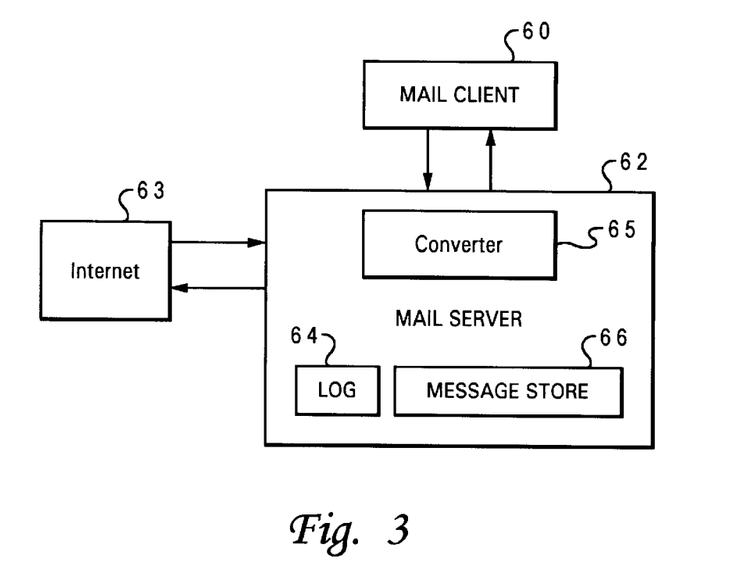
FIG. 3 depicts a high level functional block diagram of an electronic client/server architecture according to the method and system of the present invention.

With reference now to FIG. 3, there is depicted a block diagram of an electronic mail client/server architecture where a mail client 60 interacts with a mail server 62, which further includes a converter 65, a log manager 64 and a message store 66. Mail client 60 may pass data to mail server 62 whereby mail server 62 may forward the data to other computers in a network or to the internet 63. In addition, mail server 62 may receive data destined for mail client 60 from the internet and store the data in message store 66 until requested by mail client 60. Converter 65 preferably receives and transmits all data for mail server 62. Converter 65 also converts received data into a protocol procurable by the mail server 62. In reverse, converter 65 converts data into a protocol utilized by a client 60 before transmitting data to the client 60. In addition, converter 65 manages data input/output for log manager 64 and message store 66. Message store 66 keeps a complete copy of each message received at mail server 62 until the message is deleted. Log manager 64 keeps track of all transmissions to and from message store 66 in a data storage structure such as a database as will be understood by one well skilled in the art. The database may further include a queue structure such that order of transmissions is maintained and the last transmission is quickly accessible.

The functional blocks of both the mail client and the mail server illustrated in FIG. 3 may be incorporated within computer 10 of FIGS. 1 and 2. Mail server 62 preferably includes at least one data storage system with redundancy such that data may be recovered in case of drive failure. Such a data storage system may include a RAID data storage system as is well-known in the art. In addition, mail server 62 preferably includes additional hardware to expand the capacity of mail server 62, such as ethernet support hardware, as is well-known in the art.

Figure 4:
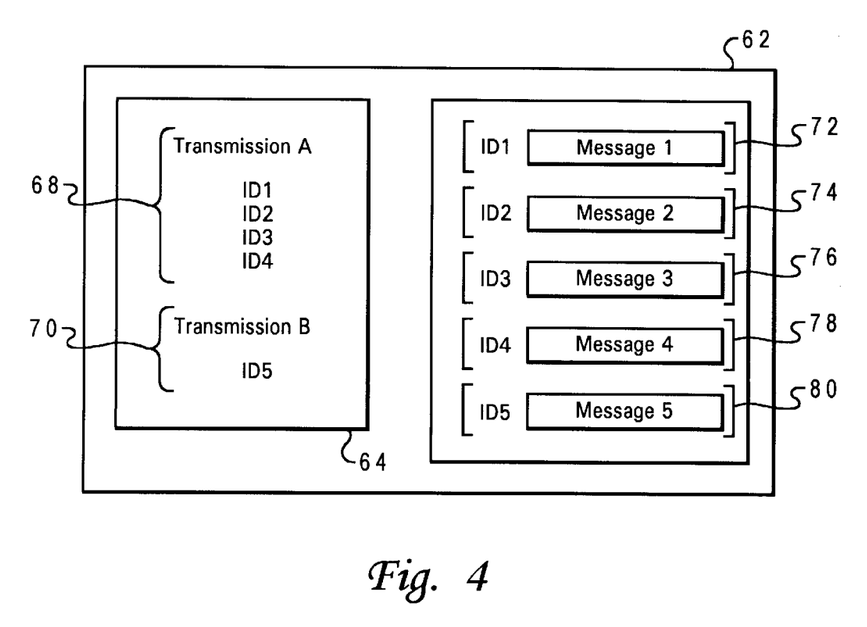
FIG. 4 illustrates a high level illustrative block diagram of a log manager and message store according to the method and system of the present invention.

Referring now to FIG. 4, there is illustrated a block diagram of the functions of log manager 64 and message store 66 incorporated within mail server 62 according to the method and system of the present invention. In log manager 64, an identification of each transmission of messages from message store 66 through mail server 62 to mail client 60 is recorded. In the example illustrated, a list is shown in log manager 64 wherein a transmission A includes ID 1, 2, 3, and 4 as depicted at reference numeral 68. Subsequently, a transmission B includes ID 5 as illustrated at reference numeral 70. ID1, ID2, ID3, ID4, and ID5 listed in log manager 64 provide a reference to a message block in message store 66 where the entire message is stored. In the example, messages 1, 2, 3, 4, and 5 are illustrated within message store 66 at reference numerals 72, 74, 76, 78 and 80. In reference, ID1 identifies Message1, ID2 identifies Message 2, ID3 identifies Message 3, ID4 identifies Message 4 and ID5 identifies Message 5. The entries depicted in log manager 64 and message store 66 are intended to provide a general example of the functions and relationships of the components within mail server 62. It will be understood by one skilled in the art that each transmission typically includes additional information such as a date and time of transmission and a destination. Depending on the protocol utilized, other additional information and signals may be transmitted. In addition, it will be understood by one skilled in the art that the labels utilized in FIG. 4 may also be addresses or other numeric representations of the location in message store 66 at which each message is stored.

Figure 5A:
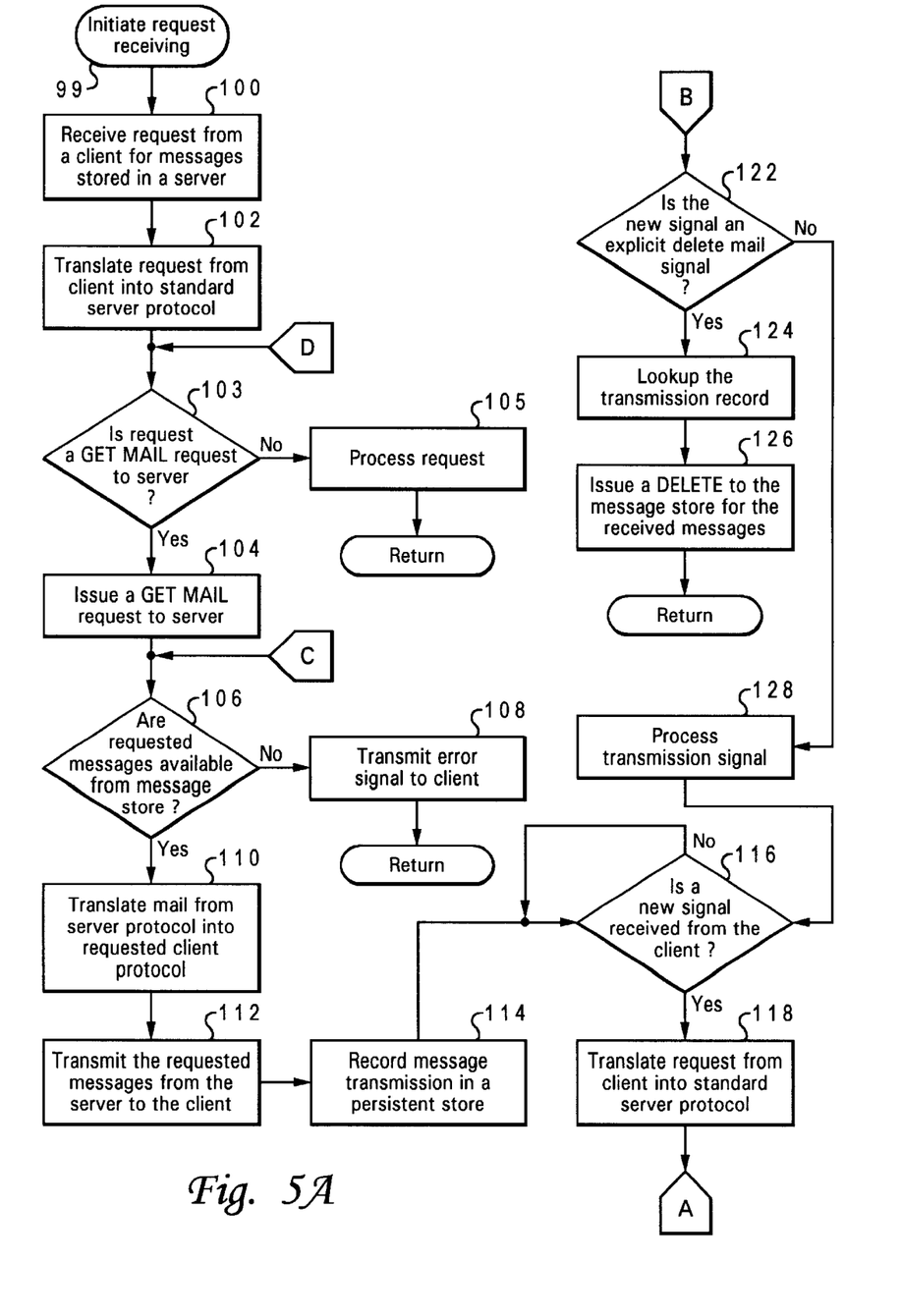
FIG. 5 depicts a high level logic flowchart of the method of deleting messages from a server according to the method and system of the present invention.
Figure 5B:
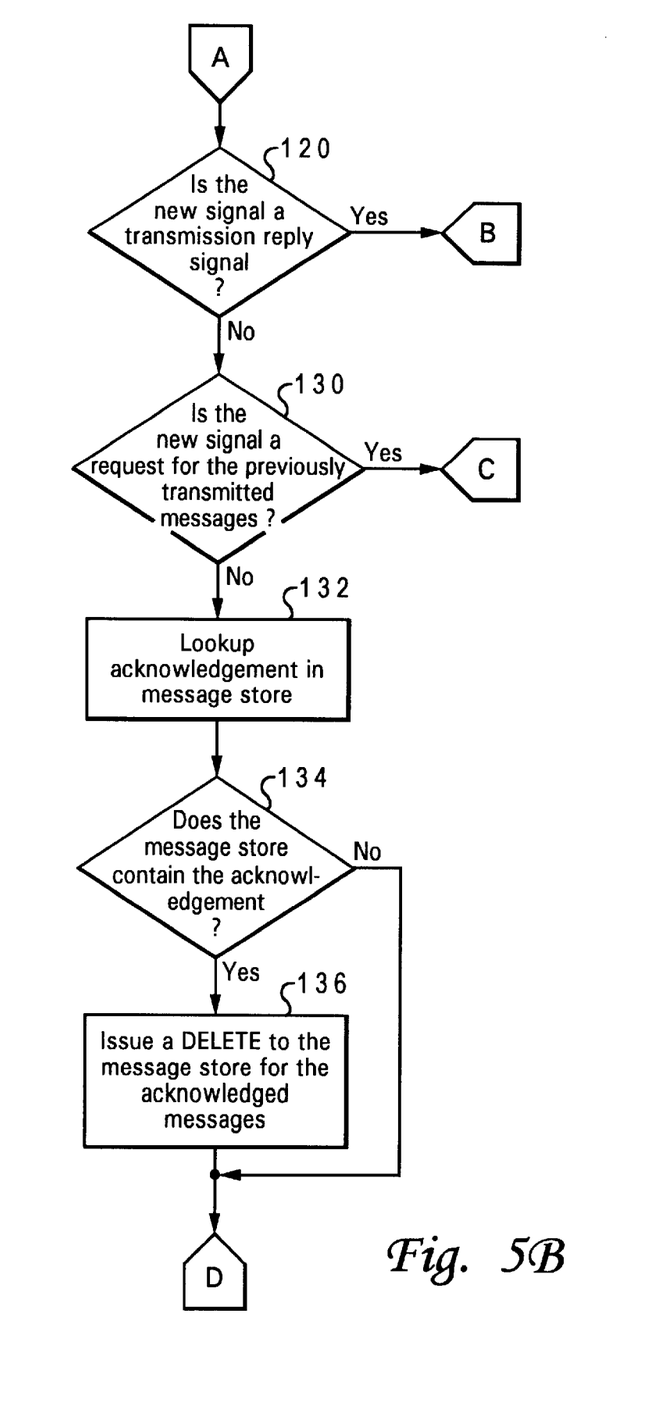

With reference now to FIG. 5, there is depicted a high level logic flowchart which illustrates the method of the present invention. It should be appreciated by those skilled in the art that FIG. 5 represents a self-consistent sequence of steps leading to a desired result. The steps are those requiring physical manipulation of physical quantities. Usually, although not necessarily, these quantities take the form of electrical or magnetic signals capable of being stored, transferred, combined, compared and otherwise manipulated. It has proven convenient at times by those skilled in the art to refer to these signals as bits, values, elements, symbols, characters, terms, numbers or the like. It should be born in mind, however, that all of these and similar terms are to be associated with the appropriate physical quantities and are merely convenient labels applied to those quantities.

The present invention relates to method steps for operating a processor such as processor 12 of FIG. 1, in processing electrical or other physical signals to generate desired physical signals.

As illustrated, the process described in FIG. 5 begins at block 99 and thereafter passes to block 100. A plurality of triggers in the operation of processor unit 12 may trigger the process which begins at block 99. For example, when a server begins to receive requests for messages, the process to initiate request receiving which begins at block 99 may be triggered.

Block 100 illustrates the receiving of a request from a client to a server. Thereafter, the process passes to block 102. Block 102 depicts a translation of the request from the client into standard server protocol such as GOLD protocol. Converter 65 translates the request from the protocol utilized by the client into the standard server protocol as will be understood by someone well known in the art. Thereafter, the process passes from block 102 to block 103. Block 103 illustrates the determination of whether or not the request is a get mail request to the server. In response to a request other than a get mail request, the process passes to block 105.

Block 105 depicts the processing of the request whereafter the process returns. Otherwise, in response to a get mail request, the process passes to block 104. Block 104 illustrates the issuance of a Get Mail request to the server. Converter 65 issues the translated mail request to the server. Thereafter, the process passes from block 104 to block 106. Block 106 depicts a determination of whether or not the requested messages are available from the message store. The server checks the log manager to determine if the requested messages are available. If the messages are not available then the converter transmits an error signal to the client utilizing the protocol in which the request was made as illustrated at block 108. After transmitting the error signal to the client as illustrated at block 108, the process returns.

With reference again to block 106, if the requested messages are available from the message store, the process passes to block 110. Block 110 illustrates the translating of mail stored in the message store from server protocol into requested client protocol. Since a single client may send message requests in multiple protocols, the protocol utilized by the client is registered in the converter at block 102 when the request is made in order for the converter to properly translate the requested mail at block 110. Thereafter the process passes from block 110 to block 112. Block 112 depicts the transmitting of the requested messages from the server to the client. Following block 112, the process passes to block 114. Block 114 depicts the recording of a list of the transmitted messages in a log manager in the server. Following block 114, the process passes to block 116.

Block 116 illustrates the determination of whether or not there is a new signal received from the client. At block 116, until a new signal is received, the process stalls and the server may process signals from other clients or the internet. When a new signal is received from the client, the process passes to block 118. Block 118 depicts the translation of the request from the client into standard server protocol by the converter. Thereafter, the process passes from block 118 to block 120. Block 120 illustrates a determination of whether or not the new signal is an explicit transmission reply signal which in the present example is a three-digit POP signal. A transmission reply signal utilizes a first layer of a protocol by sending a particular signal in response to the processing status of a message at a client. If the new signal is a transmission reply signal, the process passes to block 122. Block 122 depicts a determination of whether or not the new signal is an explicit delete mail signal. In the present example, a specific three-digit POP signal indicates that mail from the last transmission should be deleted. If the new signal is not an explicit delete mail signal, the process passes to block 128. Block 128 depicts the processing of the received transmission signal which may be a three-digit POP signal other than the delete signal. Thereafter, the process passes from block 128 to block 116 and waits for a new signal to be received from the client.

Referring again to block 122, the process passes to block 124 if the new signal is an explicit delete mail signal in a first protocol layer. Block 124 illustrates the looking up of the transmission record. The explicit delete mail signal allows the server to identify the transmission to be deleted after the mail has been properly delivered and viewed by the user of the client server. Thereafter the process passes from block 124 to block 126. Block 126 depicts an issuance of a DELETE to the message store for the received messages which have been viewed, whereafter the received messages are deleted from the message store.

With reference again to block 120, the process passes to block 130 in response to the new signal not being a transmission reply signal. In the present example, a signal transmitted in OFX protocol will not be detected as a transmission reply signal. Block 130 depicts the determination of whether or not the new signal is a request for previously transmitted messages. If the request is for previously transmitted messages, the messages were not properly transmitted and will be retransmitted as the process passes to block 106. Otherwise, at block 130, if the new signal is not a request for the previously transmitted messages then the process passes to block 132. Block 132 illustrates the looking up of an acknowledgement in the transmission records of the message store. OFX protocol does not include an explicit delete transmission in a first protocol layer, but in the next data request, an acknowledgement of receipt of the previously transmitted messages at the mail client may be attached to the request in a second protocol layer. By utilizing the acknowledgement from the next signal, the process utilizes a second protocol layer for inferring reception of the previously transmitted messages. The explicit delete signal of POP provides more security for deleting messages in that the messages have been received and viewed before the explicit delete signal is sent. However, in order to delete messages sent in OFX protocol from the server, another layer of the protocol must be utilized whereby a high degree of security is still maintained in deleting messages. To determine proper reception for other protocols which do not include an explicit delete transmission, additional cases may be included in the process utilized within the mail server.

Referring still to block 132, thereafter the process passes to block 134. Block 134 depicts the determination of whether or not the message store contains the transmission correlating with the acknowledgement. If the message store does contain the transmission correlating with the acknowledgement, then the process passes to block 136. Block 136 illustrates the issuance of a delete command to the message store for the received messages. Thereafter, the process passes from block 136 to 103. In addition, at block 134, if the message store does not contain the transmission then the process passes to block 103. Block 103 determines whether or not the new request is a get mail request as previously described.

While the invention has been particularly shown and described with reference to a preferred embodiment, it will be understood by those skilled in the art that various changes in form and detail may be made therein without departing from the spirit and scope of the present invention. For example, although aspects of the present invention have been described with respect to a data processing system executing software that directs the method of the present invention, it should be understood that the present invention may alternatively be implemented as a computer program product for use with a data processing system. Programs defining the functions of the present invention can be delivered to data processing system via a variety of signal-bearing media, which include, without limitation, non-writeable storage media (e.g. CD-ROM), writeable storage media (e.g. a floppy diskette or hard disk drive), and communication media, such as computer and telephone networks including internet and ethernet. It should be understood, therefore, that such signal-bearing media, when carrying or encoding computer readable instructions that direct the method functions of the present invention, represent alternative embodiments of the present invention.

What is claimed is:

1. A method of reliably deleting requested messages from an electronic mail server system operating within a client/server network having at least one client connected to a server, the method comprising the steps of:

storing messages in a message store in said server, wherein said server operates independently of a communication protocol utilized by said client/server network;

recording a list of said requested messages transmitted from said server to said client;

inferring reception of said requested messages transmitted utilizing a communication protocol which lacks an explicit delete acknowledgment by:
  searching for an acknowledgment from a second communication protocol which is associated with said requested messages, and
  inferring reception of said requested messages if said acknowledgment is found; and in response to inferring reception of said requested messages, retrieving said list of said requested messages and automatically deleting said requested messages referenced in said retrieved list, such that said requested messages transmitted utilizing a communication protocol which does not provide an explicit delete acknowledgment may be automatically deleted from said server.

2. The method of reliably deleting requested messages from an electronic mail server system according to claim 1, further comprising the step of:

converting a request for messages from a communication protocol utilized by said client to a particular communication protocol utilized by said server.

3. The method of reliably deleting requested messages from an electronic mail server system according to claim 1, further comprising the step of:

converting said requested messages from a particular communication protocol utilized by said server for storing said requested messages into a communication protocol utilized by said client before transmitting said requested messages from said server to said client.

4. The method of reliably deleting requested messages from an electronic mail server system according to claim 1, said step of receiving an explicit delete acknowledgment at said server which acknowledges the reception of said requested messages at said client and deleting said requested messages in response thereto, further comprising the step of:

receiving a POP explicit delete acknowledgment from said client after said client has received and viewed said requested messages.

5. The method of reliably deleting requested messages from an electronic mail server system according to claim 1, said steps of searching for an acknowledgement from a second communication protocol which is associated with said requested messages and inferring reception of said requested messages if said acknowledgment is found, further comprising the step of:

detecting an acknowledgment of the reception of said requested messages in a next signal following a request for said requested messages received at said server from said client where said next signal is transmitted in OFX protocol.

6. A system for reliably deleting requested messages from an electronic mail server system, where said electronic mail server system operates within a client/server network system having at least one client connected to a server and operates independently of a communication protocol utilized by said client/server network system between said client and said server, where at least one protocol utilized by said client does not provide an explicit delete acknowledgment, said system comprising:

a message store in said server for storing messages intended for said client;

a log manager associated with said message store for recording a list of said requested messages transmitted from said server to said client; and a converter, which controls input/output of data between said server and said client, wherein said converter receives a request for a transmission of messages from said client, wherein said converter prompts the transmission of said requested messages from said server to said client, wherein in response to receiving an explicit delete acknowledgment which acknowledges reception of said requested messages at said client, said converter sends a delete command to said messages store, wherein said message store deletes said requested messages from said messages store in response thereto, wherein said converter infers reception of said requested messages transmitted utilizing a communication protocol which lacks an explicit delete acknowledgment by searching for an acknowledgment from a second communication protocol which is associated with said requested messages, and wherein in response to inferring reception of said requested messages, said converter retrieves said list of said requested messages and automatically sends a delete command to said message store for said requested messages referenced in said list, and wherein in response to receiving said delete command, said message store deletes said requested messages, such that said requested messages transmitted utilizing a communication protocol which does not provide an explicit delete acknowledgment maybe deleted from said server.

7. The system for reliably deleting requested messages from an electronic mail server system according to claim 6, wherein said converter in said server converts a request for messages from a communication protocol utilized by said client to a communication protocol utilized by said server and converts said requested messages from a communication protocol utilized by said server for storing messages to a communication protocol utilized by said client.

8. The system for reliably deleting requested messages from an electronic mail server system according to claim 6, wherein said converter receives a POP explicit delete acknowledgment from said client after said client has received and viewed said requested messages.

9. The system for reliably deleting requested messages from an electronic mail server system according to claim 6, said converter for searching for an acknowledgement from a second communication protocol which is associated with said requested messages, further comprising:

means for detecting an acknowledgment of transmission of said requested messages in a next signal following a request for said requested messages received at said server from said client where said next signal is transmitted in OFX protocol.

10. A program product for reliably deleting requested messages from an electronic mail server system, where said electronic mail server system operates within a client/server network system having at least one client connected to a server and operates independently of a communication protocol utilized by said client/server network system between said client and said server, said program product comprising:

a data processing system usable medium; and a server message deletion program encoded within said data processing system usable medium that, in response to receiving a request for a transmission of messages from said server to said client, transmitting said requested messages from said server to said client, and recording a list of said transmitted messages from said server to said client:

receives an explicit delete acknowledgment which acknowledges reception of said requested messages at said client and deletes said requested messages in response thereto, infers reception of said requested messages transmitted utilizing a communication protocol which lacks an explicit delete acknowledgment by:

searching for an acknowledgment from a second communication protocol which is associated with said requested messages, and inferring reception of said requested messages if said acknowledgment is found, and in response to inferring reception of said requested messages, retrieves said list of said requested messages and automatically deletes said requested messages referenced in said list from said server.

11. The program product according to claim 10, wherein said server message deletion program:

converts a request for messages from a communication protocol utilized by said client to a communication protocol utilized by said server, and converts said requested messages from a communication protocol utilized by said server to a communication protocol utilized by said client.

12. The program product according to claim 10, wherein said server message deletion program receives a POP explicit delete acknowledgment from said client after said client has received and viewed said requested messages.

13. The program product according to claim 10, wherein said server message deletion program detects an acknowledgment of transmission of said requested messages in a next signal following a request for said requested messages received at said server from said client where said next signal is transmitted in OFX protocol.

* * * * *

UNITED STATES PATENT AND TRADEMARK OFFICE
CERTIFICATE OF CORRECTION

PATENT NO.     : 6,430,598 B1
DATED          : August 6, 2002
INVENTOR(S)    : Dorrance et al.

It is certified that error appears in the above-identified patent and that said Letters Patent is hereby corrected as shown below:

<u>Title page,</u>
Item 57, please delete the entire ABSTRACT, and substitute the following:

--A method and system are disclosed for reliably deleting messages from an electronic mail server system, where the electronic mail server system operates within a client/server network system having at least one client connected to a server and operates independently of a protocol utilized by the client/server network system between the client and the server, where at least one protocol utilized by the client does not provide an explicit delete signal. The client requests a transmission of messages from the server. A list of references to the requested messages to be transmitted from the server is logged within the server. The requested messages are then transmitted from the server to the client. The client may send an acknowledgement of the reception of the transmission of the requested messages from the server to the client in a first protocol layer. However, if the acknowledgement is not sent in the first protocol layer, then the reception of the requested messages is inferred. A reception is inferred if an acknowledgement is searched for and found in a second protocol layer which is associated with the transmission of the requested messages. The list of the requested messages is retrieved upon acknowledgement of reception of the requested messages which are referenced in the list of the requested messages. The messages referenced in the retrieved list of the requested messages are automatically deleted from the server such that requested messages transmitted in a protocol which does not provide an explicit delete acknowledgement may be automatically deleted from the server.-

Signed and Sealed this

Eighteenth Day of March, 2003

JAMES E. ROGAN
*Director of the United States Patent and Trademark Office*